US006213415B1

(12) United States Patent
Cheung

(10) Patent No.: US 6,213,415 B1
(45) Date of Patent: Apr. 10, 2001

(54) PROCESS FOR IMPROVING GRINDING OF CEMENT CLINKER IN MILLS EMPLOYING ROLLERS

(75) Inventor: Josephine H. Cheung, Waltham, MA (US)

(73) Assignee: W.R. Grace & Co.-Conn., New York, NY (US)

( * ) Notice: Subject to any disclaimer, the term of this patent is extended or adjusted under 35 U.S.C. 154(b) by 0 days.

(21) Appl. No.: 09/394,237

(22) Filed: Sep. 13, 1999

(51) Int. Cl.$^7$ ......................................................... B02B 5/02
(52) U.S. Cl. ............................... 241/22; 106/739; 106/757
(58) Field of Search ............................. 241/22, 117, 119, 241/120; 106/739, 757

(56) References Cited

U.S. PATENT DOCUMENTS

| | | | |
|---|---|---|---|
| 3,443,975 | 5/1969 | Serafin et al. | 106/90 |
| 3,615,785 | 10/1971 | Moorer et al. | 106/90 |
| 3,951,347 | 4/1976 | Tiggesbaumker et al. | 241/52 |
| 4,094,470 | 6/1978 | Waldhofer | 241/46 |
| 4,204,877 | 5/1980 | Moorer et al. | 106/90 |
| 4,357,287 | 11/1982 | Schonert | 264/39 |
| 4,491,480 | 1/1985 | Schenker et al. | 106/90 |
| 4,582,260 * | 4/1986 | Folsberg | 241/19 |
| 4,598,872 | 7/1986 | Henne et al. | 241/19 |
| 4,711,401 | 12/1987 | Serafin | 241/16 |
| 4,909,450 * | 3/1990 | Henne et al. | 241/119 |
| 4,919,341 | 4/1990 | Lohnherr | 241/18 |
| 4,927,086 | 5/1990 | Henne et al. | 241/80 |
| 5,125,976 | 6/1992 | Skvara et al. | 106/724 |
| 5,203,512 | 4/1993 | Ferraris | 241/16 |
| 5,429,675 | 7/1995 | Cheung et al. | 106/802 |
| 5,720,796 | 2/1998 | Cheung et al. | 75/746 |
| 5,788,879 * | 8/1998 | Ogura et al. | 252/88.1 |
| 5,948,157 * | 9/1999 | McKenney et al. | 106/711 |
| 6,005,057 * | 12/1999 | El-Jazairi | 525/327.7 |
| 6,033,468 * | 3/2000 | Folks et al. | 106/741 |
| 6,068,696 * | 5/2000 | Anttila et al. | 106/726 |

OTHER PUBLICATIONS

POLYCOM® ensures trouble-free and highly economical operation, 2 pages.

* cited by examiner

Primary Examiner—Ed Tolan
(74) Attorney, Agent, or Firm—Craig K. Leon; William L. Baker

(57) ABSTRACT

An exemplary process for grinding cement clinker using rollers comprises introducing cement clinker into grinding contact with rollers operative to grind the clinker into particles; and introducing to the clinker and/or rollers, in an amount of 0.001–0.5 percent based on the dry weight of clinker, a binding-densifying agent comprising at least one polymer having an average molecular weight of 50,000–500,000. The clinker may be ground alone or in combination with other agrillaceous or pozzolanic materials.

21 Claims, No Drawings

PROCESS FOR IMPROVING GRINDING OF CEMENT CLINKER IN MILLS EMPLOYING ROLLERS

FIELD OF THE INVENTION

The present invention relates to the use of additives for the grinding of cement clinker, and more particularly to the use of at least one high molecular weight polymer in mills that employ rollers for grinding the cement clinker and optional further pozzolanic materials.

BACKGROUND OF THE INVENTION

U.S. Pat. No. 5,720,796 of Cheung et al. disclosed grinding aids for treating blast furnace slag feed of roll presses using 0.002 to 0.2 weight percent of polyacrylic acid or its alkali metal salt in combination with up to about 4 weight percent water. Such roll presses are comprised of opposed rollers through which granulated blast furnace slag is fed and ground into finer particles.

The present invention, on the other hand, concerns the grinding of cement clinker which may optionally be interground with other agrillaceous materials such as clay or pozzolanic materials such as natural pozzolan, flyash, limestone, blast furnace slag, and others. The present invention therefore contemplates a different grinding material with different hardness and morphology than the granulated blast furnace slag. In this case, cement clinker is provided in the form of spheroids having an average diameter of 1–3 cm.

The present invention may also be applied to the use of roller mills which employ rollers in an arrangement different from roll presses. Roller mills have sets of grinding rollers that rotate above a grinding table which travels in a circular path, and a classifier that is mounted above the rollers and the grinding table.

Roller mills are designed to pulverize and classify solid materials such as clays, clinker, gypsum, natural pozzolan, limestone, and blast furnace slag. A typical roller mill thus has a set of rollers, a roller table typically ranging from 30 inches to 200 inches in diameter, and a classifier component in one circular housing unit or enclosure. An example is shown in FIG. 1 of U.S. Pat. No. 3,951,347 which is incorporated herein by reference. Roller mills are used for raw materials grinding and finished material grinding in cement manufacturing plants. In the grinding of both raw and finished materials, the materials are conveyed or fed to the center of the roller table and become distributed on the table surface to form a bed or layer of material. Centrifugal force of the unit moves the materials from the center of the table to the outer table rim. As the bed of material passes between the rollers and table, the material becomes progressively pulverized. When the ground materials reach the rim of the grinding table, the lighter and smaller particles are conveyed upwards by an air stream into a cyclone as products, while the heavier and coarser particles drop through the slots and are eventually re-circulated back to the center of the table for re-grinding.

Frequently, the action of the large sets of rollers on the table generates vibrations, and this is said to occur because the bed of material located between the rollers and table do not form a layer having uniform thickness or because a gust of air is generated at the back of the rollers after compaction of the bed materials by the grinding rollers. Many manufacturers have tried to improve the grinding efficiency or bed stability by increasing the frictional forces between the table, material bed, and rollers such as through changes in roller pattern and table design.

One of the objectives of the present invention is to improve the stability and uniformity of the material bed by chemical means, thereby improving the efficiency by which the cement clinker is ground by the rollers.

It is another objective of the present invention to improve the grinding performance, in general, of roller-type mills which employ the stress forces of rollers to comminute cement clinker, alone or in combination with other agrillaceous materials such as clay or pozzolanic materials such as natural pozzolan, flyash, limestone, blast furnace slag or mixture thereof.

SUMMARY OF THE INVENTION

The present invention pertains to the use of a binding-densifying agent to improve the grinding operations in which cement clinker, either alone or in combination with an agrillaceous materials such as clay or pozzolanic material comprising natural pozzolan, limestone, blast furnace slag, or mixture thereof, is ground into cement particles using rollers. It is believed that grinding efficiency of roller-actuated comminution of particulate material is provided; and, where the grinding operation involves roller mills especially, the uniformity and stability of the materials bed on the grinding table is significantly improved to the point at which vibrations of the roller mills are reduced.

An exemplary process of the invention comprises introducing a cement clinker into grinding contact with rollers operative to grind the clinker into cement particles; and introducing to said clinker or said rollers, in an amount of 0.001–0.5 percent based on the dry weight of the cement clinker being introduced to said rollers, a binding-densifying agent comprising at least one polymer having an average molecular weight of 50,000–500,000

The feed stream of clinker into milling operations usually involves particles having an average diameter of 1–3 cm. The clinker is ground into smaller particles having a mean particle size of about 100–1000 microns. The binding-densifying agents contemplated in the invention are needed for attaching to the cement particles throughout various size ranges, such that, when compacted (i.e., densified because of greater mass/volume ratio), both the uniformity of the material bed of clinker/particles and grinding efficiency are improved. The binding-densifying agent polymer may be introduced into the pozzolanic material before it is deposited onto the rollers or grinding surface, or onto the layer of material after it has been deposited between opposed rollers (such as in a roll press) or between rollers and grinding table surface (such as in a roller mill). The polymer may even be introduced into the air stream (roller mill) swirled about or above the roller and grinding table surface.

Further advantages and features of methods and compositions of the invention may be further apparent in the following detailed description of exemplary embodiments.

DETAILED DESCRIPTION OF EXEMPLARY EMBODIMENTS

Portland cement clinker is prepared by sintering a mixture of components including calcium carbonate (as limestone), aluminum silicate (as clay or shale), silicon dioxide (as sand) and miscellaneous iron oxides. During the sintering process, chemical reactions take place wherein hardened nodules, commonly called clinkers, are formed. After the clinker has cooled, it is pulverized together with a small amount of gypsum (calcium sulfate) in a finish grinding mill to provide a fine, homogeneous powdery product known as Portland cement.

Cementitious compositions prepared by processes of the invention thus comprise primarily cement clinker, in other words, at least 40% by weight of Portland cement, and more preferably at least 80%. Secondary agrillaceous or pozzolanic materials may also be mixed in with the cement clinker, such as clay, natural pozzolan, flyash, limestone, blast furnace slag, or a mixture thereof.

A typical roller mill has a plurality of rollers, a horizontal grinding surface (or "roller table") typically ranging from 30 inches to 200 inches in diameter, and usually a classifier component in one common housing (typically cylindrical in shape) which houses rollers, table, and classifier. Materials are conveyed (such as by pipe) into the mill housing and distributed at the center of the grinding table to form a bed or layer of particulate material that is compacted and ground between rollers and table. Each set of rollers typically rotates about a pivotal point above a circularly rotated grinding table. The centrifugal force generated by the action of the grinding table carries the materials from the center of the table to its outer rim. When the bed of material is passed between the rollers and the table, they are pulverized. The ground material spills over the outer rim of the grinding table where lighter and smaller particles are conveyed upwards by an air stream towards the classifier which is mounted in the upper part of the roller mill housing. The heavier and coarse particles which spill over the outer rim of the grinding table, on the other hand, drop through the slots and are eventually re-circulated back to the center of the table to undergo further grinding between the rollers and table.

As previously mentioned in the background of this application, vibration sometimes occurs when the material bed is not layered or compacted in a relatively uniform height or depth and/or if the rollers are not continuously contacting the bed in a uniform manner caused by the sudden burst of air compressed out from the material bed.

Exemplary binding-densifying agents contemplated by the invention for grinding cement clinker, either alone or with other cementitious materials, comprise a homopolymer or copolymer having an average molecular weight between 50,000 and 500,000, and more preferably between 100,000 and 300,000. The polymer may be branched or linear, but is preferably linear. The polymer may comprise a polyacrylic acid or salt thereof, a polyvinyl alcohol, a polyvinyl acetate, a polyvinyl chloride, a polyoxyethylene, a polysulfonic acid or salt thereof, a polyamide, or mixture thereof. The binding-densifying agent is preferably used in the amount of 0.001–0.5% based on the weight of clinker material (and any optional cementitious material) being ground by the rollers.

Further exemplary processes of the invention comprise the use of binding-densifying agents having blends of polymers formed by mixing two polymers having different average molecular weights. For example, an exemplary binding-agent may comprise a first polymer having an average molecular weight of at least 100,000 and a second polymer having an average molecular weight between 50,000–100,000. The ratio of first polymer to second polymer is preferably in the ratio of 1:20 to 20:1. Thus, a preferred first polymer may comprise a polyacrylic acid or salt, which is in linear form, having an average molecular weight of 150,000; while a preferred second polymer may comprise a polyacrylic acid or salt, in branch or linear form (more preferably linear), having an average molecular weight of 50,000.

A further exemplary process of the invention comprises employing a binding-densifying agent that comprises a first polymer having an average molecular weight of 50,000–500,000 and a second polymer having an average molecular weight of 100–50,000, the average molecular weight of said second polymer being different than the average molecular weight of said first polymer. The first polymer and second polymer may be used in the molar ratio of 1:20 to 20:1.

A still further exemplary process of the invention comprises introducing the afore-mentioned binding-densifying agent along with one or more conventional dispersion agents, such as a glycol (e.g., diethylene glycol), a hydroxylamine (e.g., preferably a tertiary alkanolamine) and/or its acetate and formate salts), or mixture thereof. For example, triethanolamine, triisopropanolamine, and/or a hydroxylamine such as N,N-bis(2-hydroxyethyl)-2-propanolamine may be additionally used in combination with the exemplary binding-densifying agents of the invention. The exemplary binding agent and conventional dispersion agent may be employed in ratios of from 1:20 to 20:1. When two or more binding-densifying agent polymers ("A" & "B") are employed with a conventional dispersion agent ("C"), the ratios of the components (A:B:C) may be 1:1:20 to 20:20:1 by dry weight.

Another exemplary process of the invention comprises introducing aforementioned binding-densifying agent (and optional dispersion agent) into the cement clinker feed stream of a roller mill; into the recycled stream (whereby coarse cement particles are re-circulated back to the center of the horizontal grinding surface or table); onto the top of a layer of cement material on top of the table; into an air stream that is swirled around the rollers and table; or any combination of the foregoing.

For distribution purposes, the binding-densifying agent (and optional dispersion agent) may be diluted by up to a factor of ten in an aqueous solution and injected into the roller mill, such as into an air stream directed towards the rollers and/or table surface, into an air stream lifted upwards into the classifier, and/or into an air stream that is used for re-circulating particles back to the center of the table. Alternatively, the binding-densifying agent may be squirted or sprayed in an aqueous form directly onto the rollers, table, and/or cement clinker feed stream (e.g., input feed stream or recirculating feed streams).

The foregoing discussion and example are provided for illustration only and are not intended to limit the scope of the invention.

I claim:

1. A process for improving grinding operations in which cement clinker is ground into cement particulates using rollers, said process comprising: introducing a cement clinker into grinding contact with rollers operative to grind the clinker into cement particles; and introducing to said clinker or said rollers an amount of 0.001–0.5 percent based on the dry weight of the cement clinker being introduced to said rollers, a binding-densifying agent comprising at least one polymer having an average molecular weight of 50,000–500,000.

2. The process of claim 1 wherein said rollers are rotatably mounted against a grinding table which travels in a circular path; said process further comprising providing a layer of cement clinker in said path; and introducing said binding-densifying agent into or onto said layer of clinker on said grinding table.

3. The process of claim 1 wherein said rollers are mounted in an opposed fashion whereby cement clinker is ground between said rollers; said process further comprising introducing cement clinker between said rollers; and introducing said binding-densifying agent into or onto said clinker prior to said introduction of said clinker between said rollers.

4. The process of claim 1 further comprising introducing, into grinding contact with said rollers along with said cement clinker, a further agrillaceous material comprising clay or pozzolanic materials comprising a natural pozzolan, flyash, limestone, blast furnace slag or mixture thereof.

5. The process of claim 4 wherein said cement clinker is used in an amount which exceeds 40 percent by weight of the total of materials comprising said clinker and said further agrillaceous material.

6. The process of claim 4 wherein said cement clinker is used in an amount which exceeds 80 percent by weight of the total of materials comprising said clinker and said further agrillaceous material.

7. The process of claim 1 wherein said binding-densifying agent is introduced to said cement clinker material prior to said clinker material being ground by said rollers.

8. The process of claim 2 further comprising providing a layer of cement clinker on said grinding table, and introducing said binding-densifying agent onto or into said layer of cement clinker on said grinding table.

9. The process of claim 2 further comprising swirling an air stream above said grinding table surface, and introducing said binding-densifying agent into said swirling air stream.

10. The process of claim 1 wherein said at least one polymer of said binding-densifying agent comprises a polyacrylic acid or salt thereof, a polyvinyl alcohol, a polyvinyl acetate, a polyvinyl chloride, a polyoxyethylene, a polysulfonic acid or salt thereof, a polyamide, or mixture thereof.

11. The process of claim 1 wherein said binding-densifying agent comprises a first polymer having an average molecular weight of at least 150,000; and a second polymer having an average molecular weight between 50,000–100,000.

12. The process of claim 11 wherein the ratio of first polymer to second polymer is preferably in the molar ratio of 1:20 to 20:1.

13. The process of claim 1 wherein said binding-densifying agent comprises a first polymer having an average molecular weight of 50,000–500,000 and a second polymer having an average molecular weight of 100–50,000, the average molecular weight of said second polymer being different than the average molecular weight of said first polymer.

14. The process of claim 13 wherein said first polymer and said second polymer are used in the molar ratio of 1:20 to 20:1.

15. The process of claim 1 wherein said at least one polymer comprises a linear polymer.

16. The process of claim 1 further comprising, in addition to said at least one polymer of said binding-densifying agent, introducing to said clinker or said rollers, a conventional grinding additive.

17. The process of claim 16 wherein said conventional grinding additive comprises a glycol, a secondary or tertiary ($C_2$–$C_5$) alkanolamine or its salt, or a mixture thereof.

18. The process of claim 17 wherein said conventional grinding additive comprises a polymer different from said binding-densifying agent polymer.

19. The process of claim 17 wherein the ratio of binding-densifying agent polymer to said conventional grinding additive is 20:1 to 1:20 based on dry weight.

20. A process for improving grinding operations in which cement clinker is ground into cement particulates using rollers, said process comprising: introducing a cement clinker into grinding contact with rollers operative to grind the clinker into cement particles; and introducing to said clinker or said rollers an amount of 0.001–0.5 percent based on the dry weight of the cement clinker being introduced to said rollers, a binding-densifying agent comprising at least one polymer having an average molecular weight of 50,000–500,000, said at least one polymer of said binding-densifying agent comprising a polyacrylic acid or salt thereof, a polyvinyl alcohol, a polyvinyl acetate, a polyvinyl chloride, a polyoxyethylene, a polysulfonic acid or salt thereof, a polyamide, or mixture thereof; and further introducing, into grinding contact with said rollers along with said cement clinker, a further agrillaceous material comprising a clay or a pozzolanic material selected from the group consisting of a natural pozzolan, flyash, limestone, blast furnace slag or mixture thereof; said cement clinker being used in an amount which exceeds 40 percent by weight of the total of materials comprising said clinker and said agrillaceous or pozzolanic material.

21. The process of claim 20 wherein said binding-densifying agent comprises a first polymer having an average molecular weight of at least 150,000; and a second polymer having an average molecular weight between 50,000–100,000.

* * * * *